(12) United States Patent
Akieda et al.

(10) Patent No.: US 11,959,895 B2
(45) Date of Patent: Apr. 16, 2024

(54) ANALYSIS APPARATUS PROVIDED WITH A PLURALITY OF CHROMATOGRAPHIC APPARATUSES

(71) Applicants: HITACHI HIGH-TECH CORPORATION, Tokyo (JP); Roche Diagnostics Operations, Inc., Indianapolis, IN (US)

(72) Inventors: Daisuke Akieda, Tokyo (JP); Takayuki Sugime, Tokyo (JP); Izumi Ogata, Tokyo (JP); Makoto Nogami, Tokyo (JP)

(73) Assignees: HITACHI HIGH-TECH CORPORATION, Tokyo (JP); ROCHE DIAGNOSTICS OPERATIONS, INC., Indianapolis, IN (US)

( * ) Notice: Subject to any disclaimer, the term of this patent is extended or adjusted under 35 U.S.C. 154(b) by 757 days.

(21) Appl. No.: 16/961,344

(22) PCT Filed: Nov. 30, 2018

(86) PCT No.: PCT/JP2018/044165
§ 371 (c)(1),
(2) Date: Jul. 10, 2020

(87) PCT Pub. No.: WO2019/138725
PCT Pub. Date: Jul. 18, 2019

(65) Prior Publication Data
US 2020/0371072 A1    Nov. 26, 2020

(30) Foreign Application Priority Data

Jan. 11, 2018  (JP) ................................ 2018-002849

(51) Int. Cl.
*G01N 30/60*    (2006.01)
*G01N 30/24*    (2006.01)
(Continued)

(52) U.S. Cl.
CPC ......... *G01N 30/6043* (2013.01); *G01N 30/24* (2013.01); *G01N 30/34* (2013.01); *G01N 30/7233* (2013.01)

(58) Field of Classification Search
CPC ....... G01N 2030/027; G01N 2030/628; G01N 30/24; G01N 30/34; G01N 30/46;
(Continued)

(56) References Cited

U.S. PATENT DOCUMENTS

| 6,613,575 B1 * | 9/2003 | Hindsgaul ............ G01N 33/538 250/281 |
| 2002/0084222 A1 | 7/2002 | Brann |

(Continued)

FOREIGN PATENT DOCUMENTS

| JP | 01-131457 A | 5/1989 |
| JP | 2002-168842 A | 6/2002 |

(Continued)

OTHER PUBLICATIONS

Majors et al, The Chromatography and Sample Preparation Terminology Guide (Year: 2013).*

(Continued)

*Primary Examiner* — David L Singer
(74) *Attorney, Agent, or Firm* — MATTINGLY & MALUR, PC

(57) ABSTRACT

The analysis apparatus includes a standby section which is provided between a dispensing operation of an analysis item B' prior to an analysis item C and the sample analysis channel introduction. The sample analysis channel introduction is arranged prior to a data collection section of an (Continued)

analysis item A. The operation is started earlier but after a sample dispensing operation section of the analysis item A. A sample dispensing operation section of the analysis item C can be started earlier and the analysis time of the analysis item C can be moved to immediately after a sample analysis operation section of the analysis item B'. The analysis item A in a second cycle can be started earlier by the early start time of the analysis item C in a first cycle. A total processing time Tc can be shorter than a total processing time Tb.

2 Claims, 9 Drawing Sheets

(51) Int. Cl.
 G01N 30/34 (2006.01)
 G01N 30/72 (2006.01)
(58) Field of Classification Search
 CPC .. G01N 30/466; G01N 30/7233; G01N 30/86; G01N 30/8658; G01N 30/8662
 See application file for complete search history.

(56) References Cited

U.S. PATENT DOCUMENTS

| | | | |
|---|---|---|---|
| 2004/0026617 A1* | 2/2004 | Gregori | G01N 30/84 250/288 |
| 2004/0053336 A1* | 3/2004 | Hindsgaul | G01N 33/538 435/7.1 |
| 2005/0269264 A1* | 12/2005 | Fermier | G01N 30/36 210/136 |
| 2013/0014566 A1 | 1/2013 | Marks | |
| 2015/0247829 A1 | 9/2015 | Sumiyoshi | |
| 2016/0363569 A1 | 12/2016 | Walsh et al. | |

FOREIGN PATENT DOCUMENTS

| | | |
|---|---|---|
| JP | 2004-524518 A | 8/2004 |
| JP | 2005-257575 A | 9/2005 |
| JP | 4372419 B2 | 11/2009 |
| JP | 2010-014559 A | 1/2010 |
| WO | 2014/049823 A1 | 4/2014 |
| WO | 2017/216934 A1 | 12/2017 |

OTHER PUBLICATIONS

Waters 717plus Autosampler Operator's Manual, Waters Corporation (Year: 1993).*
Collins English Dictionary, Definition of Valve (Year: 2018).*
John Dolan, How Does It Work? Part III: Autosamplers, LCGC North America—Jul. 1, 2016, vol. 34, Issue 7, pp. 472-478 (Year: 2016).*
International Preliminary Report on Patentability dated Jul. 23, 2020, received in corresponding International Application No. PCT/JP20189/044165.
Extended European Search Report received in corresponding European Application No. 18899125.1 dated Sep. 16, 2021.
Chang, M. et al., "Throughput Improvement of Bioanalytical LC/MS/MS by Sharing Detector between HPLC Systems" in High-Throughput Analysis in the Pharmakological Industry, Jan. 1, 2008, pp. 119-140.
International Search Report of PCT/JP2018/044165 dated Feb. 19, 2019.
Communication Pursuant to Article 94(3) EPC received in corresponding European Application No. 18 899 125.1 dated Oct. 16, 2023.

* cited by examiner

[Fig. 1]
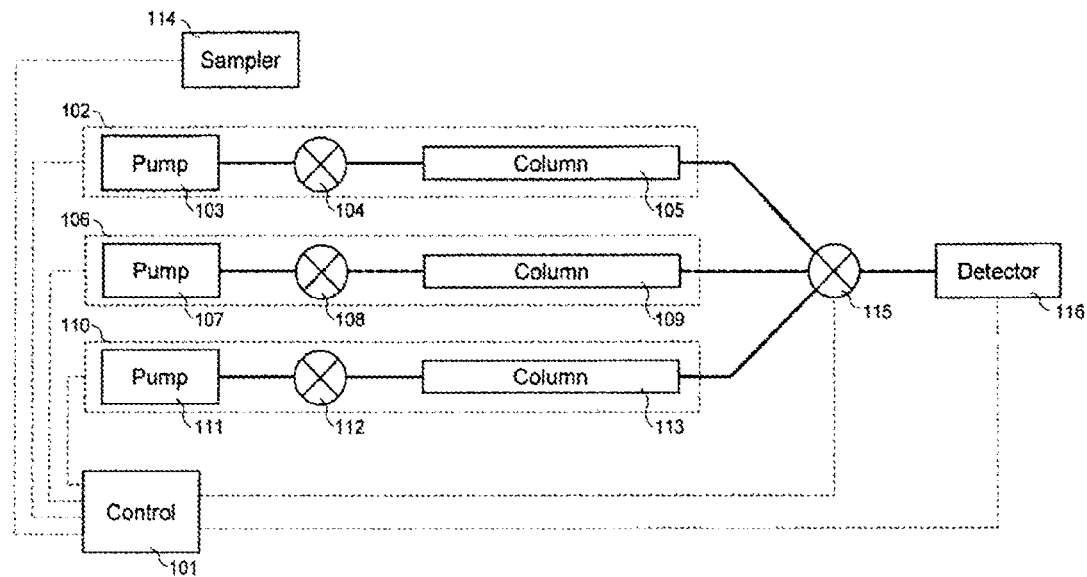
[Fig. 2]
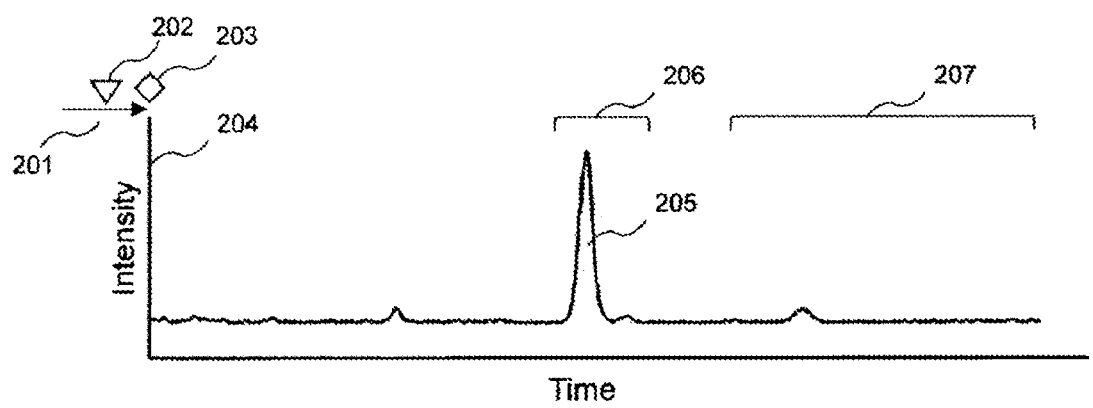

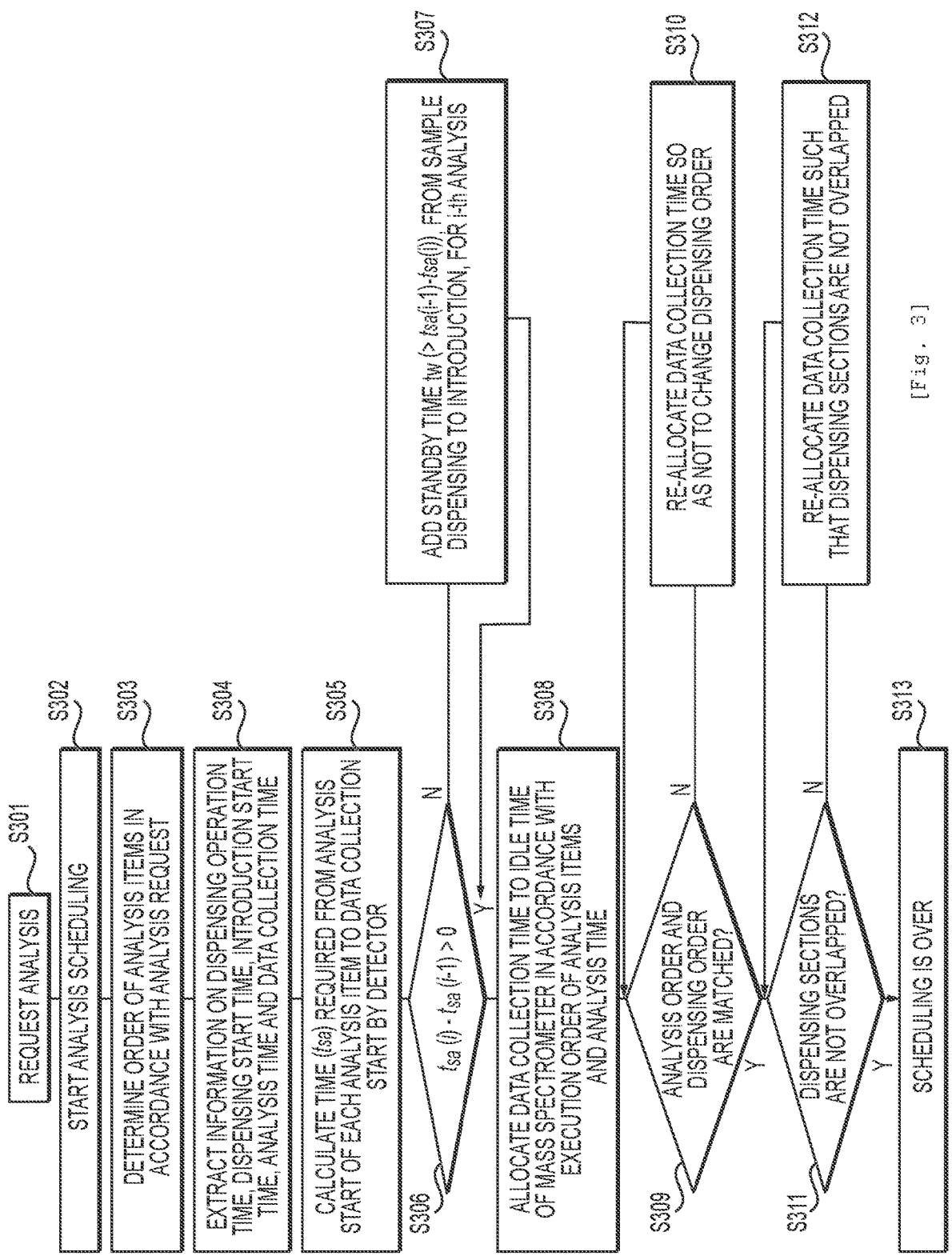

[Fig. 4A]
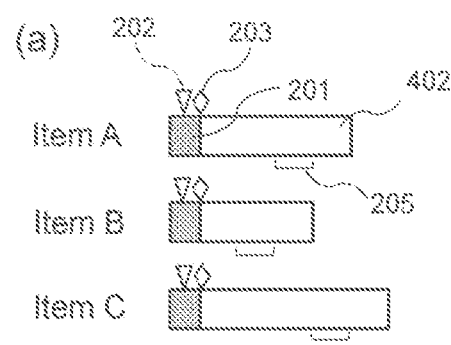

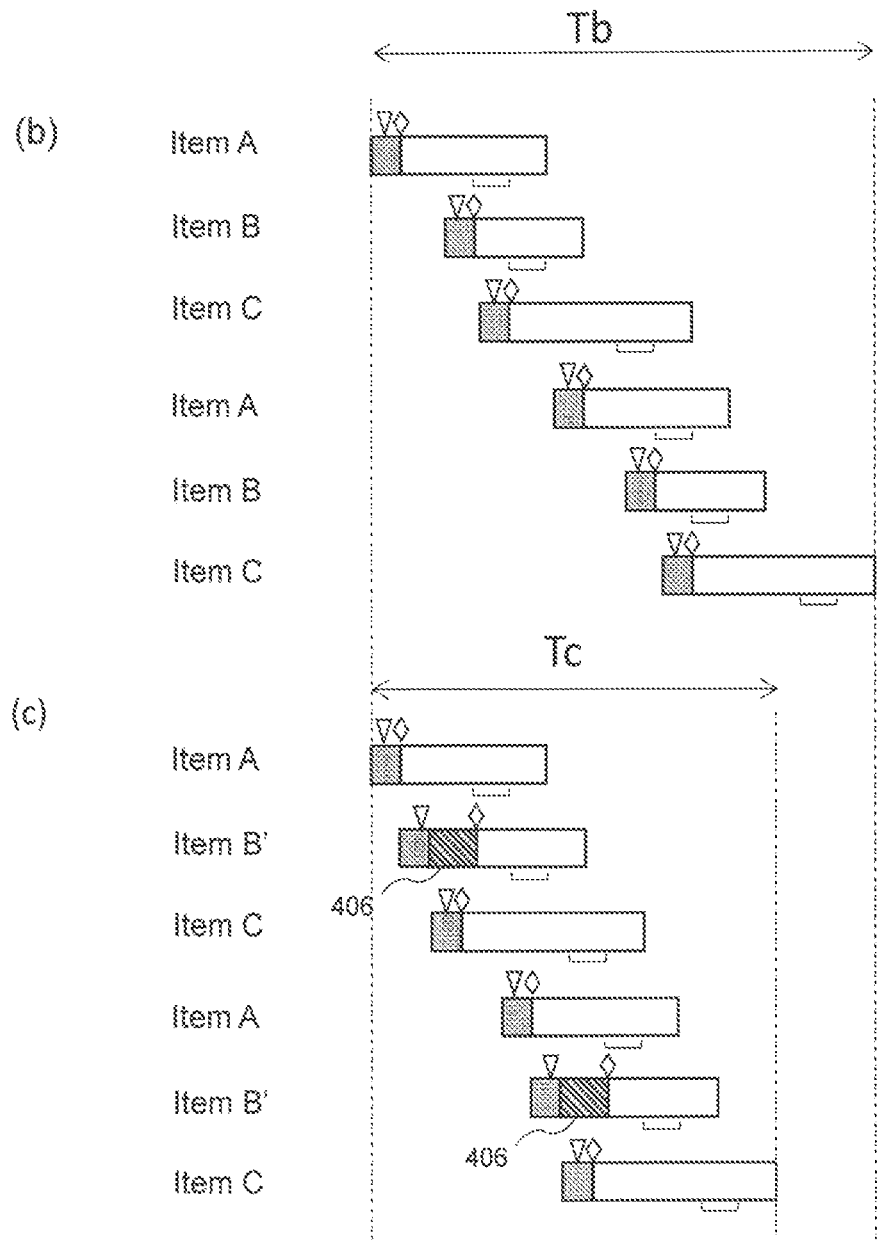
[Fig. 4B]

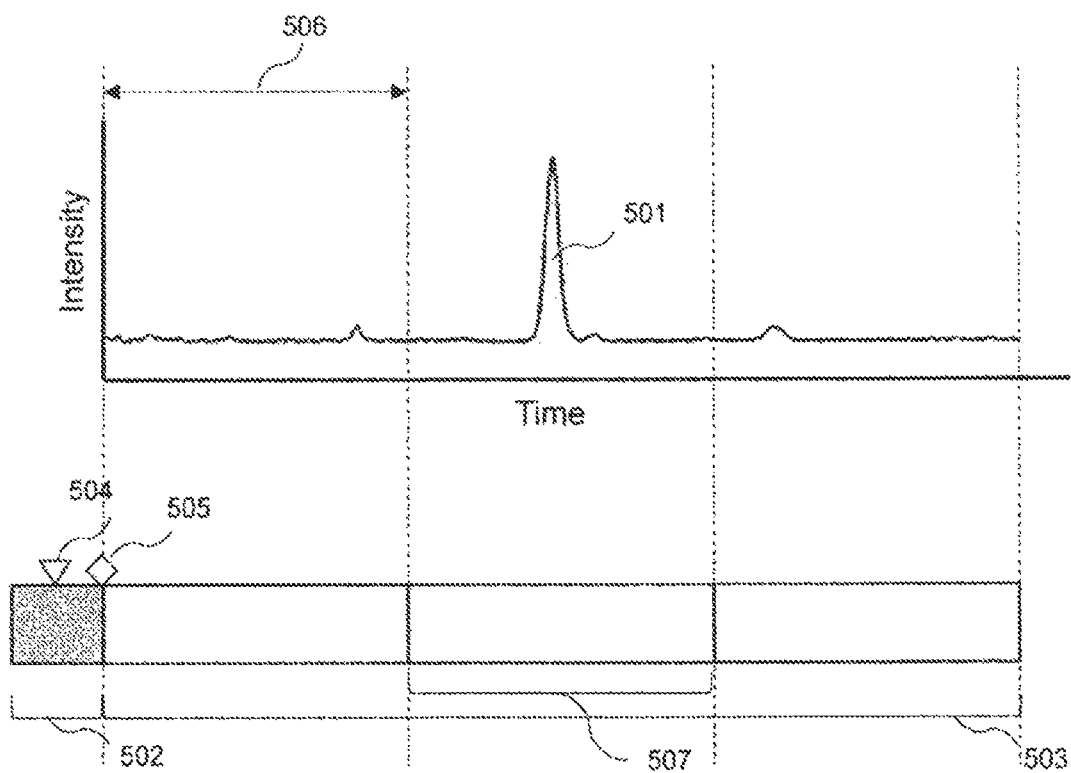
[Fig. 5]

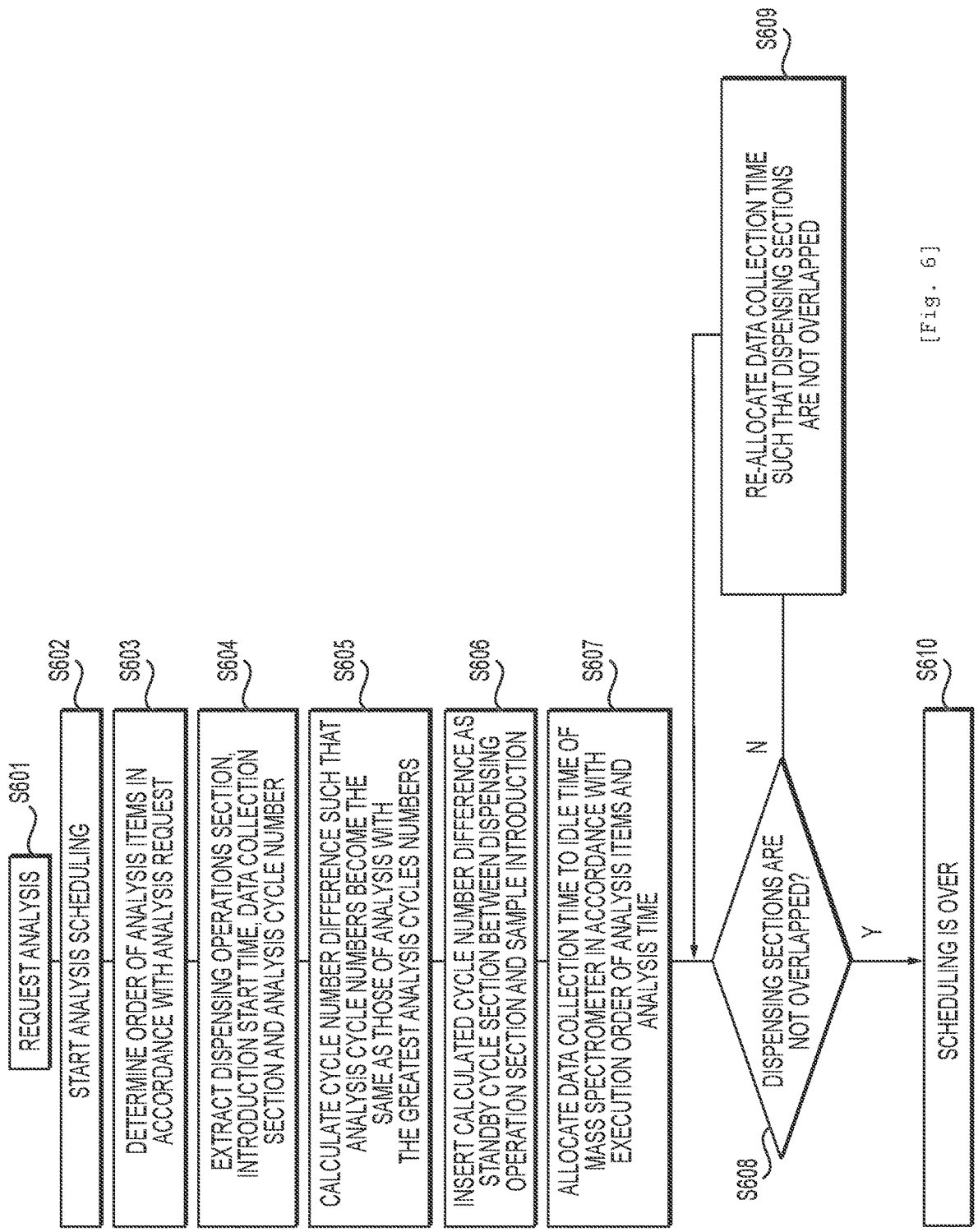
[Fig. 6]

[Fig. 7A]
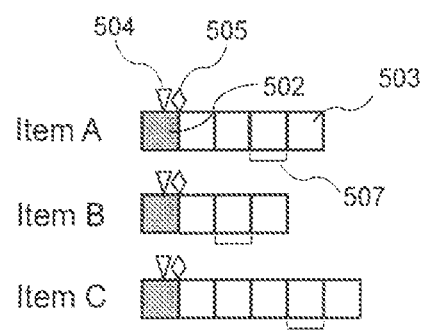
[Fig. 7B]
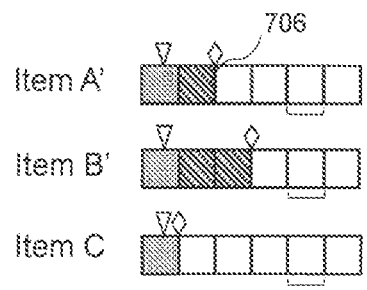

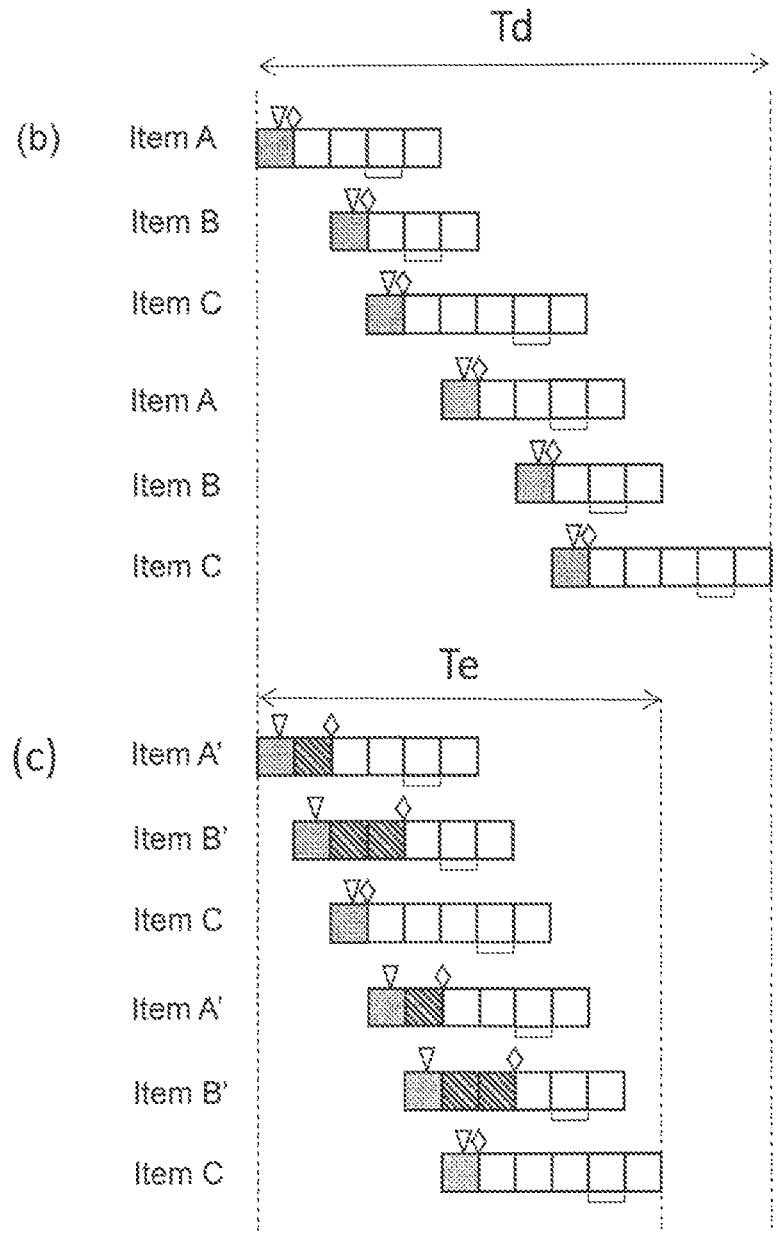
[Fig. 7C]

[Fig. 8]
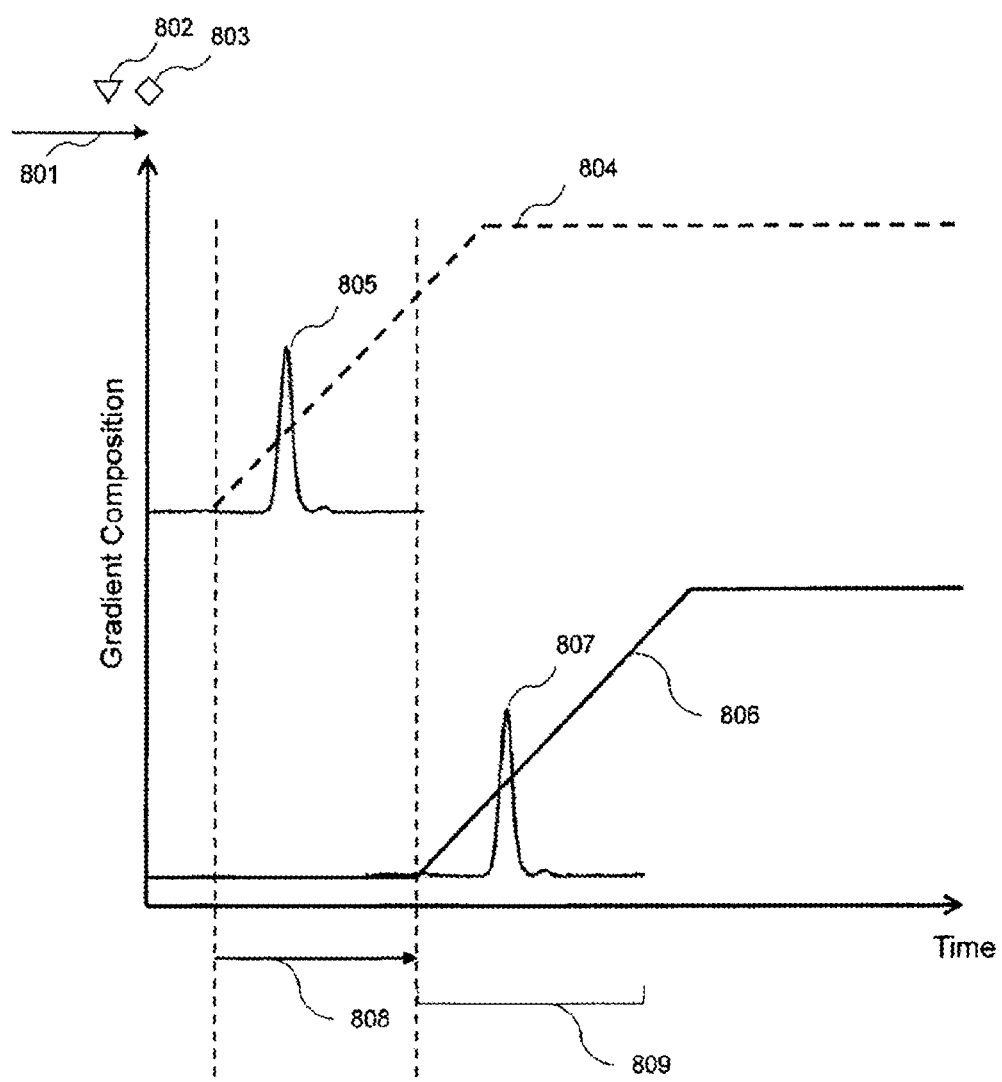

ANALYSIS APPARATUS PROVIDED WITH A PLURALITY OF CHROMATOGRAPHIC APPARATUSES

TECHNICAL FIELD

The present invention relates to the analyzer with a chromatograph that combines a plurality of chromatographs and a detector.

BACKGROUND ART

Chromatograph is an analyzer to identify the sample components by adding the sample that contains the measurement target components to the mobile phase to be sent to the column to separate the sample, where the sample components are separated in the stationary phase, and each component separated into different time components is detected by the detector.

For example, in a High Performance Liquid Chromatograph (HPLC) that uses a solvent in a mobile phase, the liquid delivery device delivers the solvent under high pressure, and the sample injected into the analysis channel from the sample injection part installed downstream of the liquid delivery device is separated into each component in the separation column filled with the stationary phase. Then the components are detected by the detectors, such as ultraviolet and visible absorptiometer, fluorometer, or mass spectrometer, and identified.

In this case, a suitable detector is selected according to the purpose of the analysis and the sample.

The chromatograph mass spectrometer, which combines a mass spectrometer that acquires mass information of the measurement target and a chromatograph, is an analyzer that introduces each component, which has been separated into time components from the measurement sample by the chromatograph, into a mass spectrometer to acquire the mass information. This chromatograph mass spectrometer is widely used for performing qualitative and quantitative analyses.

The opportunity to use a chromatograph mass spectrometer for quantitative measurement of the drug components and metabolites in biological samples and the residues in environmental samples is increasing in recent years.

Such a chromatograph mass spectrometer is often used for continuous analysis under specific analysis conditions. Thus, a high processing ability (throughput performance) as an analyzer is required.

However, conventional chromatograph mass spectrometers have a problem of often falling into the idle state in which no data is acquired since the separation of the measurement target by the chromatograph takes longer than the data collection by the mass spectrometer, resulting in low throughput performance.

In order to solve this problem, a system is proposed in the patent document 1, which improves the operating rate and throughput performance of the mass spectrometer by connecting a plurality of chromatographs to a single mass spectrometer and continuously introducing the measurement target sample, which has been separated by each chromatograph, into the mass spectrometer.

For such a multi-chromatograph mass spectrometer, in which a plurality of chromatographs is connected to a single mass spectrometer, it is important to efficiently introduce each component of the sample, which has been separated by the chromatograph, into the mass spectrometer.

CITATION LIST

Patent Literature

PTL 1: JP 4372419

SUMMARY OF INVENTION

Technical Problem

The analysis process of a chromatograph, such as HPLC, comprises column equilibration, sample injection, sample component elution, and column washing. On the other hand, the data collection process of a mass spectrometer is performed only in a specific section of the sample component elution process.

Therefore, it is important for a multi-HPLC mass spectrometer, in which a plurality of HPLCs is connected in parallel, to schedule the timing of starting analysis for each HPLC so that the data collection process of the separated samples in the mass spectrometer does not overlap.

However, in order to obtain the excellent separation performance of the measurement target substance with the analysis method using HPLC, it is common to optimize analysis conditions such as the column type, analysis channel, change amount in mobile phase composition ratio (gradient change amount), and column equilibration time for each analyte. Therefore, while the same samples can be analyzed under the same conditions, not only the analysis conditions but also the sample separation time and entire analysis time will never be the same for different measurement targets.

Therefore, when performing the analysis in which analysis items with different analysis times or sample separation times are repeated for multiple cycles, despite the possibility that the operating rate of the mass spectrometer may improve, the operating time of the analyzer may be extended, and the throughput for each analysis item may deteriorate by merely scheduling so that the sample introduction timing into the mass spectrometer does not overlap.

Also, from the characteristics of the said analysis method using HPLC, changing the analysis conditions such as flow rate and gradient change amount to adjust the elution timing of the separated components may deteriorate the separation performance.

The purpose of the present invention is to realize an analyzer having a plurality of chromatographs that can improve the overall operation efficiency even when performing the analysis in which analysis items with different analysis times or sample separation times are repeated for a plurality of cycles.

Solution to Problem

In order to achieve the above purpose, the present invention is configured as follows.

The analyzer having a plurality of chromatographs, which is equipped with a delivery device for delivering the mobile phase to the analysis channel, an injection valve connected to this delivery device to introduce the sample into the analysis channel, a multi-chromatography device with a plurality of chromatographs connected to the downstream of the injection valve and having a separation column to separate the sample into each component, at least one sample dispensing mechanism to dispense the sample to the injection valve of the multi-chromatograph, a detector to analyze the sample, a channel switching valve connected to the separation column of the multi-chromatograph to introduce the sample separated by the separation column of any of the plurality of chromatographic devices into the detector through the analysis channel, and a control unit to control operations of the said multi-chromatograph, sample dispensing mechanism, channel switching valve, and detector. The control unit controls the operation of introducing the sample into the analysis channel so that the data collection section of the detector for each sample analysis item of the plurality of chromatographs does not overlap with each other but is close to each other.

Further, the present invention is configured as follows.

The analyzer having a plurality of chromatographs, which is equipped with a liquid delivery device that delivers the mobile phase to the analysis channel, an injection valve connected to this delivery device to introduce the liquid sample into the analysis channel, a multi-chromatography device with a plurality of liquid chromatographs connected to the downstream of the injection valve and having a separation column to separate the sample into each component, at least one sample dispensing mechanism to dispense the sample to the injection valve of the multi-chromatograph, a detector to analyze the liquid sample, a channel switching valve connected to the separation column of the multi-chromatograph to introduce the sample separated by the separation column of any of the plurality of chromatographic devices into the detector, and a control unit to control operations of the said multi-chromatograph, sample dispensing mechanism, channel switching valve, and detector. The analysis section to analyze the sample is divided by an integral multiple of the reference time and normalized.

Advantageous Effects of Invention

With the present invention, the analyzer having a plurality of chromatographs, which is capable of improving the overall operation efficiency, can be realized even for the analysis that repeats analysis items with different analysis times or sample separation times for a plurality of cycles.

BRIEF DESCRIPTION OF DRAWINGS

FIG. 1 is a diagram showing a concept of a multi-HPLC mass spectrometer to which the present invention 1 is applied.

FIG. 2 is a conceptual diagram of measurement data of a liquid chromatogram.

FIG. 3 is an operation flowchart showing an exemplified scheduling process of items analyzed by the multi-HPLC mass spectrometer in Embodiment 1.

FIG. 4A is a diagram showing a time chart of continuous analysis of each analysis item in Embodiment 1 and a time chart of continuous analysis of each analysis item in a case where Embodiment 1 is not applied.

FIG. 4B is a diagram showing a time chart of continuous analysis of each analysis item in Embodiment 1 and a time chart of continuous analysis of each analysis item in a case where Embodiment 1 is not applied.

FIG. 5 is a conceptual diagram of measurement data normalizing an analysis section of a liquid chromatogram in Embodiment 2.

FIG. 6 is a diagram showing an exemplified scheduling process of normalized items analyzed by a multi-HLPC mass spectrometer in Embodiment 2.

FIG. 7A is a diagram showing an exemplified time chart of continuous analysis of each analysis item in which an analysis time is normalized in Embodiment 2.

FIG. 7B is a diagram showing an exemplified time chart of continuous analysis of each analysis item in which an analysis time is normalized in Embodiment 2.

FIG. 7C is a diagram showing an exemplified time chart of continuous analysis of each analysis item in which an analysis time is normalized in Embodiment 2.

FIG. 8 is a diagram schematically showing a change in a gradient curve by a change in a mixing ratio of a solvent and by adding a standby time in an analysis carried out using gradient elution in Embodiment 3.

DESCRIPTION OF EMBODIMENTS

Hereinafter, the mode for carrying out the present invention will be described with reference to the attached diagrams.

It should be noted that the application of the present invention is not limited to the examples described below, and it can be applied within the scope of the technical concept.

Although they are described using HPLC as a chromatograph, the examples of the present invention can be applied to other chromatographs, including GC mass spectrometers that use gas chromatography (GC), by adjusting the sample introduction timing.

Moreover, although the HPLC mass spectrometer that uses a mass spectrometer as a HPLC detector is described herein, the present invention can be applied to other detectors, such as visible/ultraviolet absorbance detectors, photodiode array detectors, and fluorescence detectors.

EMBODIMENTS

Embodiment 1

FIG. 1 is a conceptual diagram of the multi-HPLC mass spectrometer to which the first embodiment of the present invention is applied. FIG. 2 is a conceptual diagram of the measurement data of a liquid chromatogram device. FIG. 3 is an operation flowchart that illustrates an example of the scheduling process of items to be analyzed with the multi-HPLC mass spectrometer in the first embodiment. FIG. 4 is the diagram illustrating the time charts of the continuous analysis of each analysis item when the first embodiment is applied and not applied.

As shown in FIG. 1, the multi-HPLC analyzer is equipped with a HPLC system (chromatograph) 102, a HPLC system 106, a HPLC system 110, a sample dispensing mechanism (sampler) 114 for dispensing the sample to the HPLC system 102, a channel switching valve 115, a detector 116, and a control unit 101 for controlling the HPLC system 102, the sample dispensing mechanism 114, the channel switching valve 115, and the detector 116.

The HPLC system 102 has a liquid delivery device (pump) 103, which delivers the solvent serving as a mobile phase, to an analysis channel under high pressure, an injection valve 104 connected to the liquid delivery device 103 to introduce the sample into the analysis channel, and a separation column (column) 105 connected to the downstream of the injection valve 104 to be supplied with the sample from the injection valve 104 via an analysis channel and separate the supplied sample into each component.

The HPLC system 106 has the same configuration as that of the HPLC system 102. It has a liquid delivery device (pump) 107 for delivering the solvent serving as a mobile phase under high pressure, an injection valve 108 connected to the liquid delivery device 107 to introduce the sample into the analysis channel, and a separation column (column) 109 connected to the downstream of the injection valve 108 to separate the sample into each component.

The HPLC system 110 also has the same configuration as that of the HPLC system 102. It has a liquid delivery device (pump) 111 for delivering the solvent serving as a mobile phase under high pressure, an injection valve 112 connected to the liquid delivery device 111 to introduce the sample into the analysis channel, and a separation column (column) 113 connected to the downstream of the injection valve 112 to separate the sample into each component.

The separation column 105 of the HPLC system 102, the separation column 109 of the HPLC system 106, and the separation column 113 of the HPLC system 110 are connected in parallel to a single detector (mass spectrometer) 116 via the channel switching valve 115.

The sample dispensing mechanism (sampler) 114 dispenses the sample to the injection valves 104, 108, and 112 connected to the analysis channels of the HPLC systems 102, 106, and 110. The sample is introduced into the detector 116 via the channel switching valve 115.

Although a single sample dispensing mechanism 114 is illustrated in FIG. 1, a plurality of sample dispensing mechanisms 114 may be provided.

Likewise, although a single channel switching valve 115 is illustrated in FIG. 1, a plurality of channel switching valves 115 may be provided.

An apparatus equipped with HPLC systems 102, 106, and 110 is referred to as a multi-chromatographic device.

In the graph shown in FIG. 2, the horizontal axis represents time, and the vertical axis represents signal intensity. In FIG. 2, the sample dispensing operation section 201 of the sample dispensing device 114 has the introduction operation 202 for introducing the sample into either of the injection valves 104, 108, or 112, and the switching operation 203 to connect either of the injection valves 104, 108, or 112 to the analysis channel of either of the separation columns 105, 109, or 113.

The control unit 101 of the multi-HPLC system 102, 106, and 110 starts analysis steps from the analysis start point 204 when the sample is introduced into the analysis channel. Then it switches the channel switching valve 115 so that only the data collection section 206, including the peak 205, of the separated measurement target component is introduced into the detector 116 that collects data.

Generally, the gradient elution is started after the introduction of the sample in the case where the gradient elution method, in which the components are separated while changing the concentration ratio of the mobile phase, is used.

In FIG. 2, the HPLC systems 102, 106, and 110, which have introduced target components into the detector 116, prepare for the next sample introduction after going through the washing and equilibration steps 207 of the separation columns 105, 109, and 113.

In the multi-HPLC system, the control unit 101 introduces the data collection section 206 into the detector 116 to adjust the data collection time of the detector 116 so as not to overlap among a plurality of HPLC systems 102, 106, and 110.

The first embodiment illustrates the case in which the optimal scheduling of analysis items is achieved by adjusting the standby time until the injection valves 104, 108, and 112 are switched so that the measurement target sample is introduced into the analysis channel after being introduced into the injection valves 104, 108, and 112 by the sample dispensing mechanism 114, with the multi-HPLC mass spectrometer, in which a plurality of HPLC systems 102, 106, and 110 are connected to a single mass spectrometer 116 via a channel switching valve 115.

The operation flowchart in FIG. 3 illustrates the process for adjusting the introduction timing of the sample into the analysis channel so that the data collection timing does not overlap and the throughput performance does not drop when the measurement target components separated by a plurality of HPLC systems 102, 106, and 110 are introduced into the mass spectrometer (detector) 116, and data is collected.

In FIG. 3, the scheduling of each analysis item starts when the analysis request S301 is received by the multi-HPLC mass spectrometer (step S302).

As the first stage of scheduling, the control unit 101 determines the analysis order of each analysis item based on the analysis request (step S303).

Next, in step S304, the dispensing operation time, dispensing start time, introduction start time, analysis time, and data collection time of each analysis item, required for scheduling, is extracted.

In step S305, the time ($t_{sa}$) required from when the analysis of each analysis item starts until when the data collection by the mass spectrometer 116 starts is calculated based on the information extracted in step S304.

In step S306, since there is a possibility that the previous (i−1) data collection has not finished when the current (i) data collection starts if (i) $t_{sa}$ is shorter than (i−1) $t_{sa}$, the difference between (i) $t_{sa}$ and (i−1) $t_{sa}$ necessary for adjusting the timing of introducing the sample into the analysis channel is calculated.

If the calculation result in step S306 is positive, the process proceeds to step S308.

If the calculation result in step S306 is negative, a standby time (tw) is added for the after the sample is dispensed until the sample is introduced into the analysis channel by switching the injection valve 104, 108 or 112 (step S307).

After the end of step S306 and step S307, the control unit 101 allocates the data collection time to the idle time of the mass spectrometer 116 based on the analysis time of the analysis item (step S308).

Upon the allocation of the data collection time for the mass spectrometer 116, it is desirable to allocate it so as to minimize the idle time of the mass spectrometer 116.

Following the allocation of data collection time in step S308, whether or not the dispensing order of the sample dispensing mechanism 114 matches the analysis order that has been determined in step S303 (step S309) is confirmed.

In step S309, when the dispensing order of the sample dispensing mechanism 114 does not match the determined analysis order, that is, when the dispensing order is changed due to the length of analysis time, the data collection time is reallocated so as to match the dispensing order with the analysis order (step S310). Then, the process returns to step S309.

In step S309, when the dispensing order of the sample dispensing mechanism 114 matches the determined analysis order, the process proceeds to step S311.

In step S311, the control unit 101 confirms whether the dispensing sections of each analysis item do not overlap. If there is any overlapping analysis, the data collection time is reallocated (step S312).

In step S311, if there is no overlapping analysis, the scheduling ends (step S313).

As described above, the scheduling work ends after going through the process from step S302 to step S311 after the receipt of the analysis request in step S301 (step S313).

FIG. 4A illustrates an outline of the time chart for each analysis of analysis items A to C, which have different analysis times.

In FIG. 4A, the time chart comprises a sample dispensing operation section 201 and an analysis section 402. The sample dispensing operation section 201 includes a sample dispensing operation 202 to the sample injection valves 104, 108, 112, and an introduction 203 of the sample into the analysis channel. The analysis section 402 includes information on the data collection section 206 of the separated components.

In the case illustrated in FIG. 4A, the analysis section 402 of analysis item C is the longest, and the analysis section 402 of analysis item B is the shortest.

FIG. 4B (b) illustrates a case that is different from the present invention for comparison. It merely shows a case in which the dispensing operation section 201 of each analysis item A, B, C, and the data collection section 206 are scheduled so as not to overlap.

On the other hand, FIG. 4B (c) is a case in which the first embodiment of the present invention is applied. It illustrates the case in which the standby section 406 is provided during the scheduling to optimize the performance.

The schedule for analysis item B after the first-time analysis item A is as shown in the diagram illustrated in FIG. 4B (b) due to the reason that the data collection section of analysis item B must be executed after the data collection section of the previous analysis item A.

Then, the data collection section of analysis item C is required to be set after the data collection section of the previous analysis item B to allow the execution of the dispensing operation 202 of the sample of analysis item C to the injection valve after the dispensing operation 202 of the sample of analysis item B to the injection valve. Since the overall analysis time of analysis item C is longer than that of analysis item B, the data collection for analysis item C must be started after a certain period of time following the end of the data collection section of analysis item B.

The second-time operation of analysis item A is executed following the previous operation of analysis item C. However, the overall analysis time of analysis item A is shorter than that of analysis item C, and even if the data collection section is started immediately after the end of analysis item C, the dispensing operation 202 of analysis item A will start after the dispensing operation 202 of analysis item C. As for analysis item B, the execution of the second-time operation can be set in the same manner as in the first time.

As with the first-time setting, since the second-time operation of analysis item C has a longer overall analysis time than that of analysis item B, the data collection of analysis item C must be started after a certain period of time following the end of the data collection section of analysis item B.

As a result, due to the length of the total analysis time for analysis item B and analysis item C, a certain period of time must be provided between the data collection section of analysis item B and the data collection section of analysis item C. Also, in general, the time Tb is required for the schedule in which the analysis is repeated twice.

On the other hand, in the scheduling of the first embodiment illustrated in FIG. 4B (c), the standby section 406 is provided between the dispensing operation 202 of analysis item B' that is executed immediately before the analysis item C with the longest analysis time and the introduction 203 of the sample into the analysis channel. The introduction 203 of the sample into the analysis channel starts the dispensing operation 202 at an earlier timing after the sample dispensing operation section 201 of analysis item A while remaining immediately before the data collection section 206 of analysis item A.

As a result, the analysis time of analysis item C can be moved until immediately after the sample analysis operation section 201 of analysis item B' that has been adjusted to enable earlier start of the sample dispensing operation section 201 of analysis item C.

Also, the second-time analysis item A can be started earlier by the difference of time generated by the earlier start of the first analysis item C. The second-time analysis item C can be started earlier by providing the second-time analysis item B' with the standby section 406 as with the first time.

As a result, the total processing time Tc for the scheduling in the first embodiment illustrated in FIG. 4B (c) can be reduced to the one shorter than the total processing time Tb for the scheduling in FIG. 4B (b) that is different from the present invention.

That is, according to the first embodiment, the overall time of the data collection section is shortened, and the efficient performance of analysis items A, B', and C is enabled by shifting the data collection section in the mass spectrometer by providing standby section 406 between the dispensing operation 202 of analysis item B' and the sample introduction 203 and starting the dispensing of analysis item C on completion of the sample dispensing section of analysis item B' so as to make the data collection sections of the detector 116 appropriately close to each other.

The calculation of the standby time 406 and the scheduling and execution, etc. of the sample dispensing operation for a plurality of analysis items are executed by the control operation of the control unit 101.

As described above, according to the first embodiment of the present invention, the analyzer with a plurality of chromatographs that can improve the overall operation efficiency even when performing the analysis in which the analysis items with different analysis times or sample separation times are repeated for a plurality of cycles can be realized.

Embodiment 2

Next, the second embodiment will be described.

The second embodiment illustrates the case in which the analysis section of the analysis item is normalized by an integral multiple of a single reference time in the multi-HPLC mass spectrometer in which a plurality of HPLC systems are connected to a single mass spectrometer via a channel switching valve.

The second embodiment will be explained with reference to FIG. 5 to FIGS. 7A, 7B, and 7C. FIG. 5 is a conceptual diagram of the measurement data in which the analysis section of the liquid chromatograph in the second embodiment is normalized. FIG. 6 is a diagram illustrating an example of the scheduling process of each normalized analysis item to be analyzed by the multi-HPLC mass spectrometer in the second embodiment of the present invention. FIGS. 7A, 7B, and 7C are the diagrams illustrating the sample time chart of the continuous analysis of each analysis item, in which the analysis time is normalized, in the second embodiment. Since the overall configuration is the same as in the case shown in FIG. 1, the illustration and detailed description thereof will be omitted.

Moreover, the second embodiment is the case that enables the optimum scheduling of analysis items with a simpler process by adjusting the number of cycles from when the sample is introduced into the injection valves 104, 108, and 112 by the sample dispensing mechanism 114, to when the injection valves 104, 108, and 112 are switched to introduce the sample into the analysis channel when the analysis conditions with a normalized analysis section is used.

In FIG. 5, the diagram comprises the sample dispensing operation section 502, including the dispensing operation 504 to the injection valves 101, 108, and 112, the introduction 505 into the analysis channel, and the normalized analysis section 503, and the data collection section 507 is defined by a normalized time range, including the peak of the measurement target component 501. The normalized analysis section 503 is divided by the reference time 506. In the case illustrated in FIG. 5, the analysis section 503 is divided by three reference times 506.

FIG. 6 is the operation flowchart of the second embodiment. The case illustrated in FIG. 6 is an example of the process for adjusting the sample introduction timing into the analysis channel so that the data collection timing does not overlap and the throughput performance is not reduced when the measurement target components separated by the multi-HPLC system are introduced into the mass spectrometer (detector) for collecting the data under normalized analysis conditions.

In FIG. 6, when an analysis request is received (step S601) and scheduling of each analysis item is started (step S602), the control unit 101 determines the analysis order for each analysis item based on the analysis request as the first stage of scheduling (step S603).

The information required for scheduling, regarding the dispensing operation section 504, introduction start time 505, data collection section 507, and the number of analysis cycles for each analysis item is extracted in step S604. The number of analysis cycles for each analysis item is compared based on the information extracted in step S604. Then the difference between the numbers for each analysis item is calculated to adjust it to the longest analysis cycle (step S605).

The calculated differential cycle number is added after the dispensing section as the standby cycle from the dispensing operation 504 to the sample introduction 505 into the analysis channel (step S606).

After the end of the processes up to step S606, the control unit 101 allocates the data collection time to the idle time of the mass spectrometer 116 according to the analysis item execution order and the data collection section 507 (step S607).

When allocating the data collection section 507 of the mass spectrometer 116, it is desirable to allocate it so that the idle time of the mass spectrometer 116 is minimized.

Following the end of step S607, the control unit 101 confirms whether the dispensing operation section 502 of each analysis item does not overlap (step S608). If there is any overlapping analysis, the data collection section (data collection time) 507 is reallocated (step S609). Then, the process returns to step S608.

The scheduling work ends after going through the step S603 to step S609 (step S610).

FIG. 7A is a schematic diagram of the time chart of each analysis normalized for the analysis items A to C, which have different analysis times.

The time chart in FIG. 7A comprises sample dispensing operation section 502 and normalized analysis section 503, which includes information on dispensing operation 504 of the sample to the injection valve, introduction 505 of the sample into the analysis channel, and data collection section 507 of the separated components.

In the case shown in FIG. 7A, the unit number for the normalized reference time 506 of the analysis section 503 of analysis item C is the longest at 5, and the unit number (number of analysis cycles) for the normalized reference time 506 of the analysis section 503 of analysis item B is the shortest at 3. The unit number for the normalized reference time 506 of the analysis section 503 of analysis item A is 4.

FIG. 7B is a schematic diagram in which the number of analysis cycles is adjusted according to the analysis item C that has the largest number of analysis cycles (analysis section 503 is long) for each analysis item shown in FIG. 7A.

For analysis items A' and B', the reference time 506 is added between the end of the dispensing section 502 and the start of the sample introduction 505, and the standby cycle 706 is set, so that the number of analysis cycles becomes 5, which is the same cycle number as that of analysis item C. It means a single reference time 506 is added to form the standby time 706 for analysis item A', and two reference times 506 are added to form a standby time 706 for analysis item B'.

FIG. 7C (b) is a case different from the present invention for comparison. The analysis section 503 is simply divided by the reference time 506. The analysis sections 503 of analysis items A, B, and C are different from each other with no adjustment of length. Further, it illustrates a case in which the dispensing operation section 502 and data collection section 507 of each analysis item A, B, and C are scheduled so as not to overlap.

On the other hand, for the scheduling in the second embodiment shown in FIG. 7C (c), the standby section 706 composed of a single reference time 506 is provided between the dispensing operation 504 of analysis item A' and the introduction 505 of the sample into the analysis channel. Also, the standby section 706 composed of two reference times 506 is provided between the dispensing operation 504 of analysis item B', which is executed immediately before analysis item C that has the longest analysis time, and the introduction 505 of the sample into the analysis channel.

In the case illustrated in FIG. 7C (c), a standby section 706 is provided between the dispensing operation 504 of analysis item B', which is executed immediately before analysis item C that has the longest analysis time and the introduction 505 of the sample into the analysis channel. The dispensing operation 504 starts at an early timing after the sample dispensing operation section 502 of analysis item A', while the introduction 505 of the sample into the analysis channel remains immediately before the data collection section 507 of analysis item A'.

It allows the analysis section 503 of analysis item C to move to the spot immediately after the sample analysis operation section 502 of analysis item B' that has been adjusted to ensure an earlier start of the sample dispensing operation section 502 of analysis item C.

The second-time analysis item A' can start earlier by the difference of time generated by the earlier start of the first-time analysis item C. The second-time analysis item C can start earlier when the second-time analysis item B' is provided with a standby section 706 as in the first time.

Therefore, the total processing time Te in the scheduling according to the second embodiment in FIG. 7C (c) can be shorter than the total processing time Td in the scheduling according to FIG. 7C (b) that is different from the present invention.

Also, the same effect as the one in the first embodiment can be obtained in the second embodiment. In the second embodiment, the scheduling is performed after the analysis section 503 of the plurality of analysis items A, B, C is divided by the reference time 506, and the standby time 706 is added to cause the plurality of analysis items A', B', C to have the analysis section 503 that is equal to each other. It makes the execution of scheduling easier.

Embodiment 3

Next, the third embodiment will be described.

The third embodiment is applied to the case in which a gradient elution method is executed as the separation method of the measurement target sample to separate the component in a multi-HPLC mass spectrometer in which a plurality of HPLC systems 102, 106, and 110 in the present invention are connected to a single mass spectrometer (detector 116) via the channel switching valve 115.

The third embodiment is a case that realizes optimal scheduling of analysis items by adjusting the time from the introduction of the measurement target sample into the analysis channel until the start of the gradient elution, instead of adjusting the introduction timing of the measurement sample into the analysis channel, which is illustrated in the first embodiment and the second embodiment.

In the gradient elution method, components are separated by adjusting the affinity between the column (stationary phase) and the solvent (mobile phase) by changing the concentration ratio of the solvent that immobilizes the measurement target sample on the column and the solvent that separates the same from the column.

Generally, in the gradient elution method, gradient elution is started when the separation starts. However, if the solvent for immobilizing the sample is continuously delivered, the measurement target component is not separated nor eluted from the column.

By utilizing this characteristic, the elution time can be adjusted by providing a gradient standby time for continuously delivering the solvent, which was used when immobilizing the sample, from the start of the analysis until the start of the gradient elution.

The standby time necessary for adjusting the scheduling illustrated in the third embodiment is calculated not as the standby time until the sample introduction but as the standby time until the start of the gradient elution, with the same process as shown in FIG. 3 of the first embodiment and FIG. 6 of the second embodiment.

FIG. 8 is a diagram of the outline of the shifting gradient curve generated as a result of the change in the mixing ratio of the solvent and the addition of the standby time in the analysis carried out with the gradient elution method in the third embodiment.

In FIG. 8, the analysis process in the third embodiment comprises a sample dispensing process (sample dispensing section) 801 that has the sample dispensing 802 to the injection valves 104, 108, and 112 by the sample dispensing mechanism, introduction 803 into the analysis channel, and sample analysis process that starts after the sample dispensing. The gradient elution is started at any time after the analysis starts.

By adding the calculated standby time 808 to the analysis section, it becomes possible to reset the start time of the gradient elution and change the gradient curve 804 (shown by a broken line) in the prior art to the gradient curve 806 (shown by a solid line). As a result, the elution time 805 of the sample before resetting is changed (adjusted) to the adjusted elution time 807.

It allows the data collection section 809 in the mass spectrometer 116 to be set at any time, and the control unit 101 to execute scheduling for a plurality of analysis items in accordance with the idle time of the mass spectrometer.

Also, as with the first embodiment or the second embodiment, it becomes possible to add standby time for a plurality of analysis items upon scheduling. That is, the elution time can be adjusted to shorten the processing time of analysis as described above. Also, the standby time can be added to further shorten the processing time of analysis.

By utilizing the characteristics of the gradient elution method, not only the same effects as those in the first embodiment but also the effects described above can be obtained in the third embodiment as well.

DESCRIPTION OF REFERENCE NUMERALS AND SIGNS

101: control unit
102, 106, 110: HPLC system
103, 107, 111: liquid delivery device (pump)
104, 108, 112: injection valve
105, 109, 113: separation column
114: sample dispensing mechanism (sampler)
115: channel switching valve
116: detector
201, 502, 801: sample dispensing operation section
202, 504, 802: dispensing operation to injection valve
203, 505, 803: introduction into analysis channel
204: analysis starting point
206, 507, 809: data collection section
207: column washing & equilibration step
402, 503: analysis section
406, 706, 808: standby section
506: reference time
806: gradient curve
807: sample elution time

The invention claimed is:

1. An analysis apparatus provided with a plurality of chromatographic apparatuses and a detector which analyzes a sample, the analysis apparatus comprising:
a multi-chromatographic apparatus including a plurality of liquid chromatographic apparatuses, each of which has a liquid delivery device that delivers a mobile phase to an analysis channel, an injection valve that is connected to the delivery device and introduces a liquid sample into the analysis channel, and a separation column that is connected downstream of the injection valve and separates the sample into respective components;
at least one sample dispensing mechanism which dispenses a sample to the injection valve of the multi-chromatographic apparatus;
a channel switching valve which is connected to each of the separation columns of the multi-chromatographic apparatus and introduces a sample into the detector via an analysis channel, the sample being separated by any of the separation columns of any one of the plurality of chromatographic apparatuses; and
a control unit which controls operations of the multi-chromatographic apparatus, the sample dispensing mechanism, the channel switching valve and the detector, wherein an analysis section is divided into integral multiple sub-sections which are normalized by a reference time range, and wherein the control unit is configured to control an introduction operation of the sample into the analysis channel by adding the reference time to operations of the injection valve and the channel switching valve, such that data collection sections of the detector for sample analysis items of each of the plurality of chromatographic apparatuses do not overlap each other and the data collection section for a second analysis item is started after the data collection section of a first analysis item.

2. The analysis apparatus according to claim 1, wherein the plurality of chromatographic apparatuses perform gradient analysis in which a sample is separated with the separation column by gradient elution, and the control unit is configured to control the introduction operation of the sample into the analysis channel by adjusting a sample separation time of the gradient elution, such that the timing of starting the processes of data collection sections of the detector for sample analysis items of each of the plurality of chromatographic apparatuses do not overlap each other and the data collection section for the second analysis item is started after the data collection section of the first analysis item.

* * * * *